United States Patent [19]
Takahashi et al.

[11] Patent Number: 5,980,218
[45] Date of Patent: Nov. 9, 1999

[54] MULTI-STAGE COMPRESSOR HAVING FIRST AND SECOND PASSAGES FOR COOLING A MOTOR DURING LOAD AND NON-LOAD OPERATION

[75] Inventors: Kazuki Takahashi; Haruo Miura; Hideo Nishida; Naohiko Takahashi, all of Ibaraki-ken, Japan

[73] Assignee: Hitachi, Ltd., Tokyo, Japan

[21] Appl. No.: 08/921,604

[22] Filed: Sep. 2, 1997

[30] Foreign Application Priority Data

Sep. 17, 1996 [JP] Japan ................................. 8-244448

[51] Int. Cl.$^6$ .......................... F04B 25/00; F04B 39/06
[52] U.S. Cl. ........................ 417/243; 417/369; 417/366
[58] Field of Search .......................... 62/505, 117, 115, 62/509; 417/370, 423, 122, 250, 366, 53, 251, 369; 60/684; 310/54

[56] References Cited

U.S. PATENT DOCUMENTS

| | | | |
|---|---|---|---|
| 2,921,446 | 1/1960 | Zulinke | 62/117 |
| 3,022,638 | 2/1962 | Caswell et al. | 62/115 |
| 3,232,074 | 2/1966 | Weller et al. | 62/505 |
| 3,744,935 | 7/1973 | Magni | 417/370 |
| 3,748,065 | 7/1973 | Pilarczyk | 417/423 |
| 3,802,795 | 4/1974 | Nyeste et al. | 415/122 |
| 4,141,708 | 2/1979 | Lavigne et al. | 62/117 |
| 4,554,799 | 11/1985 | Pallanch | 62/509 |
| 5,312,226 | 5/1994 | Miura et al. | 415/106 |
| 5,664,939 | 9/1997 | Giordani et al. | 417/369 |

FOREIGN PATENT DOCUMENTS

| | | |
|---|---|---|
| 64-80799 | 8/1988 | Japan . |
| 3-19498 | 7/1989 | Japan . |

*Primary Examiner*—Charles G. Freay
*Assistant Examiner*—Robert Z. Evora
*Attorney, Agent, or Firm*—Antonelli, Terry, Stout & Kraus, LLP

[57] ABSTRACT

A multi-stage compressor having at least two compressor stages comprises an inter-cooler provided between the stages for cooling a gas being discharged from a compressor in the preceding stage. The compressor stages are driven by a common electric motor, of which a rotating shaft is supported by magnetic bearings. A part of the gas cooled by the inter-cooler and a part of the work gas discharged from a bleed valve provided down-stream of a rear stage of the compressor are selectively introduced into the electric motor or the magnetic bearings. Thus, at the time of load operation the gas discharged from the inter-cooler is introduced into the motor or the magnetic bearings to cool them, and at the time of non-load operation the gas discharged from the bleed valve is introduced into the motor or the magnetic bearings to cool them. It is possible to ensure a flow rate of gas required for cooling the motor during non-load operation with economy during load operation.

17 Claims, 4 Drawing Sheets

US 5,980,218

MULTI-STAGE COMPRESSOR HAVING FIRST AND SECOND PASSAGES FOR COOLING A MOTOR DURING LOAD AND NON-LOAD OPERATION

BACKGROUND OF THE INVENTION

The present invention relates to a multi-stage compressor, and more specifically, to a multi-stage compressor whose rotor is supported by magnetic bearings.

A compressed gas in a compressor is partially bled so as to cool a motor or magnetic bearings, bleeding as disclosed in Japanese Utility Model Unexamined Publication No. 3-19498. In this prior art, a centrifugal impeller is provided on an end portion of a rotating shaft of the motor, a motor rotor is supported by the magnetic bearings to constitute the compressor which cooperates with a condenser and an evaporator to constitute a refrigerating cycle. In the refrigerating cycle, a part of refrigerant is sprayed from a spray nozzle so as to cool a coil of the motor and the magnetic bearings.

Japanese Patent Unexamined Publication No. 64-80799 discloses a compressor, in which a compressor stage is combined with a high-frequency motor, a rotating shaft is supported by magnetic bearings, and which is covered with a integrated housing sealed against an outside. In this compressor, gas conduits provided between a plurality of compressor stages may function as a surface cooler. That is, a part of the compressed gas re-cooled by the surface cooler is supplied through a supply passage to a rotor of the high-frequency motor, a rotor of an exciter and the magnetic bearings to cool them, and then is returned through a discharge passage to a suction pipe.

When a cooling apparatus described in Japanese Utility Model Unexamined Publication No. 3-19498 is applied to a multi-stage compressor having a high compression ratio, the cooling gas must be partially bled from downstream of a final-stage to accommodate a necessary gas flow at the time of a non-loading operation, resulting in that a cooling air flows more than necessary during a loading operation, which is uneconomical. On the contrary, when the cooling gas is bled from an intermediate stage for the purpose of economy, a negative pressure prevails in an bleeding section during the non-loading operation, resulting in a disadvantage that the cooling gas cannot pass through the motor. In addition, the above-described cooling apparatus is associated with a centrifugal compressor provided in a refrigerating cycle, and premises that a refrigerant is used for cooling the motor or the magnetic bearings, so that an adequate cooling effect cannot be obtained for a compressor for compressing air or industrial gas.

The compressing apparatus described in Japanese Patent Unexamined Publication No. 64-80799 is forced to be a split casing structure, and the casing is surrounded by a coiled surface cooler, so that a large numbers of processes and labor are required for assembly. Moreover, the cooling during the non-loading operation is not considered at all. Furthermore, discharge of drainage from the surface cooler is not taken into consideration, so that when used to compress air or the like containing a water vapor, the drainage may be collected in the surface cooler, or splash of the drainage may be mixed into the cooling gas resulting in condensation within the compressor.

SUMMARY OF THE INVENTION

The present invention is directed to solving disadvantages of the prior art and ensuring a flow rate of cooling gas required for cooling a motor in a simple multi-stage compressor, whose rotor is supported by magnetic bearings, even at the time of non-load operation with economy at the time of load operation.

The present invention is further directed to solving disadvantages of the prior art and ensuring a flow rate of cooling gas required for cooling magnetic bearings in a multi-stage compressor, whose rotor is supported by magnetic bearings, even at the time of non-load operation with economy at the time of non-load operation.

The present invention is directed to realizing a multi-stage package-type centrifugal compressor which is small-sized, simple in construction and high in reliability.

In order to achieve the above objects, in an aspect of the present invention, there is provided a multi-stage compressor adapted to be switched between load operation and non-load operation, and including a high-speed electric motor having a rotating shaft; first and second compressor stages including impellers mounted on both ends of the rotating shaft; an inter-cooler mounted between the first and second compressor stages, a suction throttle valve provided on a suction side of the compressor; a bleed valve provided on a discharge side of the compressor; and first and second branch passages branched from a downstream side of the impeller at the second stage and from a downstream side of the inter-cooler; and wherein the first and second branch passages are connected with each other to form a confluent passage, and the confluent passage is connected to form a flow passage for permitting a cooling gas to pass through the high-speed electric motor.

Preferably, the multi-stage compressor further comprises magnetic bearings provided on the high-speed electric motor for supporting the rotating shaft, and wherein the flow passage for permitting a cooling gas to pass through the high-speed electric motor is extended to the magnetic bearings.

More preferably, the multi-stage compressor is such that the inter-cooler is provided with a drain recovering section or a first branch passage provided downstream of the impeller on the second stage is branched from downstream of the bleed valve or a check valve is provided between the branch passages and the confluent passage or a pressure regulating valve is provided in a second branch passage branched from downstream of the inter-cooler. More preferably, the multi-stage compressor comprises control means for changing an opening degree of the pressure regulating valve depending upon whether the compressor is in load operation or in non-load operation.

Preferably, the multi-stage compressor further comprises flow control means for controlling on/off of flow in the respective branch passages. More preferably, the multi-stage compressor is such that flow in the first branch passage branched from downstream of the impeller in the rear stage flows and flow in the second branch passage is stopped during non-load operation or flow in the second branch passage branched from downstream of the inter-cooler flows during load operation and flow in the first branch passage is stopped during load operation.

Further, the multi-stage compressor may comprise a return flow passage for returning the cooling gas having cooled the high-speed electric motor to upstream of the suction throttle valve or comprise a return flow passage for returning the cooling gas having cooled the magnetic bearings to upstream of the suction throttle valve.

In order to achieve the above objects, in another aspect of the present invention, there is provided a multi-stage compressor adapted to be switched between load operation and non-load operation, comprising a high-speed electric motor having a rotating shaft, first and second compressor stages including impellers mounted on both ends of the rotating shaft, and an inter-cooler mounted between the first and second compression stages, a cooling flow passage for cooling of the high-speed electric motor during load operation of the compressor and a cooling flow passage for cooling of the high-speed electric motor during non-load operation of the compressor, and wherein the cooling flow passages for load operation and non-load operation are branched at different positions between the inter-cooler and the bleed valve.

In either aspect, it is desirable that the impellers are a centrifugal impeller.

Preferably, the multi-stage compressor further comprises pressure detection means for detecting a discharge pressure of the compressor; and operation control means for effecting switching between load operation and non-load operation on the basis of an output from the pressure detection means.

Thus, in the multi-stage compressor according to the present invention, the cooling gas for the motor is fed from a plurality of branch extracting sections, so that the cooling gas for cooling of the motor can be fed from an intermediate stage of the compressor during load operation and it can be fed from an atmosphere bleed passage during non-load operation. Accordingly, it is possible to ensure a flow rate of the cooling gas required for cooling of the motor even during non-load operation with economy during load operation.

In the multi-stage compressor according to the present invention, switching between load operation and non-load operation can be effected, and the cooling gas for cooling of the magnetic bearings is extracted from a plurality of branch extracting sections. Accordingly, the cooling gas can be fed from the intermediate stage of the compressor during load operation and from the atmospheric path during non-load operation, whereby it is possible to ensure a flow rate of the cooling gas required for cooling of the magnetic bearings during non-load operation with economy during load operation.

DETAILED DESCRIPTION OF THE DRAWINGS

Hereinafter, an embodiment of the invention will be described with reference to the accompanying drawings.

Figure 2:
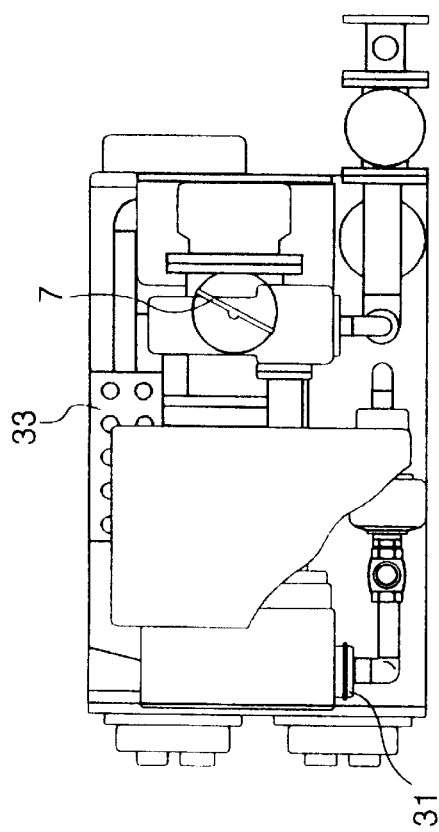
FIG. 2 shows a top plan view, a front view and a cross sectional view of the multi-stage compressor shown in FIG. 1.
Figure 2:
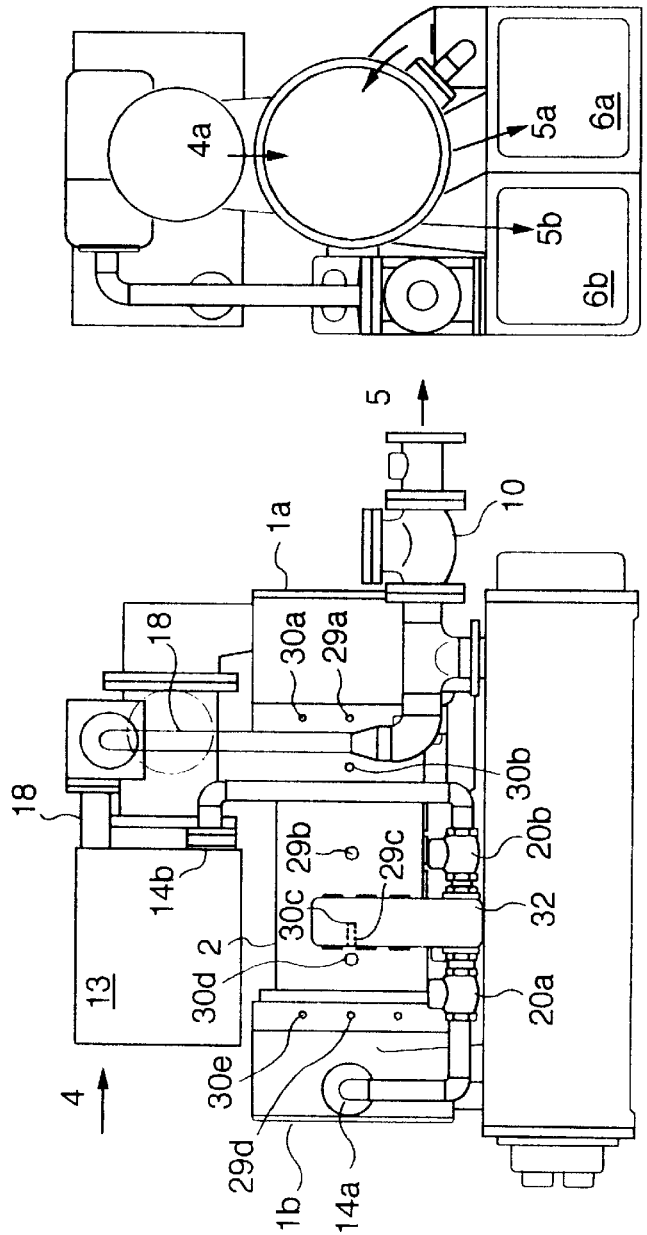

FIG. 2 is a three-side view showing a schematic shape of a multi-stage compressor according to the present invention. Provided on an upper portion of the compressor is a suction throttle valve 7 which is operatively coupled to a suction filter 13 and a bleed valve 9. Gas coolers 6a, 6b are provided on a lower portion of the compressor. A first-stage compressor 1a and a second-stage compressor 1b have suction nozzles on their outer peripheries to suck gas 4a, 4b radially. A discharge nozzle of the first-stage compressor and suction and discharge nozzles of the second-stage compressor are coupled directly to the gas coolers to realize a compact structure.

An extracting section 14a is provided on an outer periphery of a casing for the second-stage compressor to extract gas of relatively low temperature cooled in the gas cooler 6a from a suction section located immediately before an impeller of the second-stage compressor. An orifice 31 is provided immediately after the extracting section 14a so as to serve as pressure-reducing means. On the other hand, an extracting section 14b is located in front of the suction filter 13 to be communicated in the filter with an air-discharge passage 18 which is located on an upstream side of the suction throttle valve 7 and on a downstream side of the bleed valve 9.

Flow passages branched from the extracting sections 14a and 14b have check valves 20a, 20b provided therein and connected to a distributing box 32 for the cooling gas downstream of the check valves 20a and 20b. Though not clearly shown in FIG. 2, flexible tubes are used so as to connect between the cooling gas distributing box and cooling gas feeding sections 29a, 29b, 29c, 29d which are provided on an outer peripheral surface of a motor. Similarity, the cooling gas discharged from cooling gas discharging sections 30a, 30b, 30c, 30d, 30e is introduced through the flexible tubes into a cooling gas confluence box 33. The gas having cooled a motor 2 and combined with each other in the cooling gas confluence box 33 passes through a re-confluence portion 15, which is provided on the outer periphery of the casing for the first-stage compressor, to be returned to the suction portion immediately before an impeller of the first-stage compressor.

The motor 2 is a high-speed motor which is controlled by an inverter, and a rotating shaft of the motor 2 is supported by magnetic bearings. Though it is not shown, the compressor requires a power supply panel, an inverter controller, a magnetic-bearing controller and the like (not shown), which are adjacent to a compressor 1.

Figure 1:
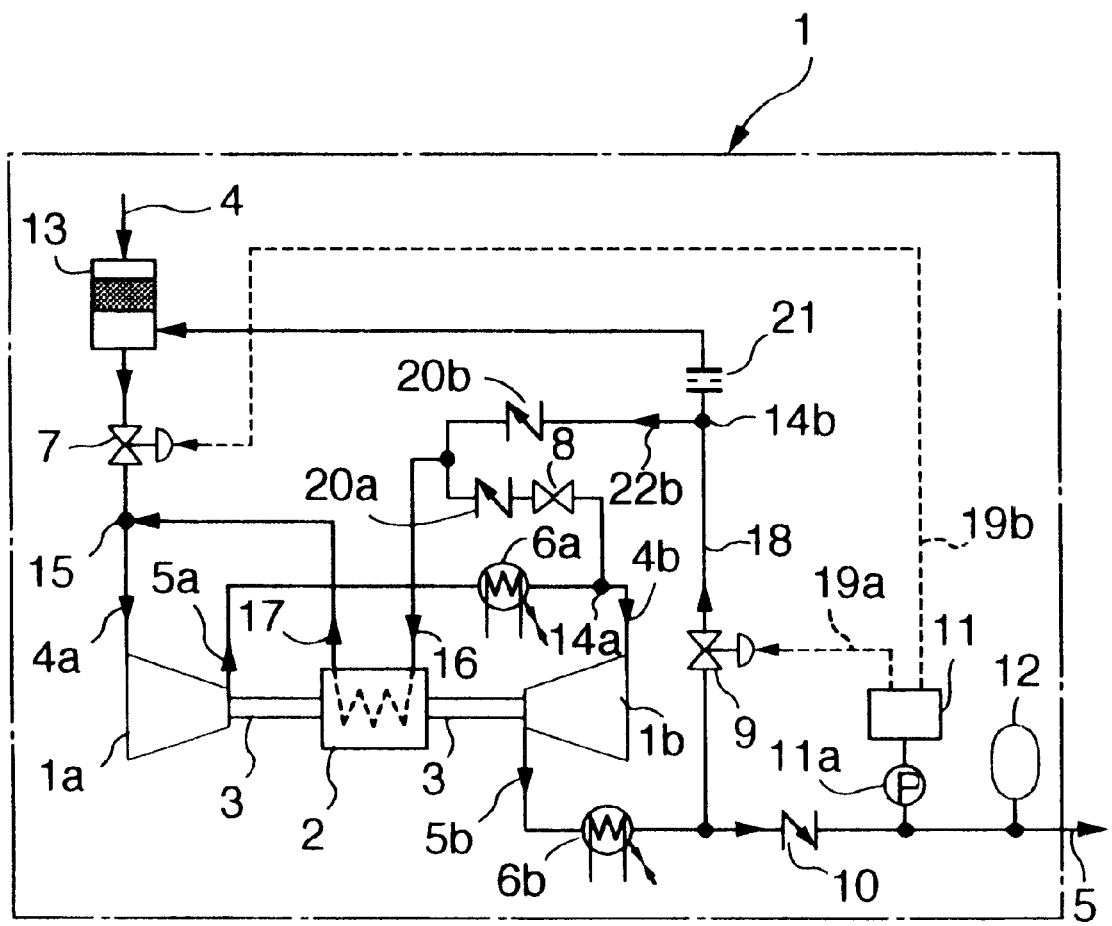
FIG. 1 is a block diagram of an embodiment of a multi-stage compressor according to the present invention.

A flow and detail of the embodiment of the multi-stage compressor shown in FIG. 2 will be described with reference to FIGS. 1 and 3. FIG. 1 is a flow diagram of a compressor system showing a construction of one embodiment of the multi-stage compressor according to the present invention. In this embodiment, the multi-stage compressor is used to generate a constant-pressure gas such as a factory air source, in which air is used as a work gas.

Referring now to FIG. 1, the compressor 1a and 1b, which form a low-pressure stage and a high-pressure stage of the multi-stage compressor 1, respectively, have at least one centrifugal impeller. The centrifugal impellers are mounted on both end sides of a rotating shaft 3, which project from a body of the motor 2, to be rotatably driven with the rotation of the motor 2. The motor 2 is a high-speed motor, of which the rotating shaft 3 is supported by magnetic bearings, and generates heat due to iron loss of coils, arranged on a drive section and the magnetic bearings, and air-flow loss resulted from a high-speed rotation.

A suction throttle valve 7 and a filter 13 are provided on the upstream of the first-stage compressor 1a. A sucked gas 4 in the compressor, from which dust is removed by the filter 13, passes through the suction throttle valve 7 to be introduced into the first-stage compressor 1a. An intermediate gas cooler 6a is provided between the first-stage compressor 1a and the second-stage compressor 1b. The gas, which is increased in pressure in the first-stage compressor 1a to be raised in temperature, is cooled in the gas cooler 6a to be introduced into the second-stage compressor 1b. Here, the filter 13 is opened to the atmosphere at its upstream side. In general, the sucked gas is a moist air containing vapor.

The gas sucked into the compressor is increased in pressure, so that the water-vapor partial pressure is increased. When the gas increased in pressure is cooled in the gas cooler 6a, the saturated pressure of vapor decreases and the gas is increased in relative humidity. Depending upon a condition of the sucked atmosphere, the vapor partially condenses to generate mist and dew if the value of the relative humidity of the gas became one and further cooled. In the embodiment of the present invention, since the resultant drainage is collected in the gas cooler, the gas cooler is enabled to discharge the drain out of the gas cooler continuously through drain recovering section 34. Thus, the relative humidity becomes one or less at the downstream side of the gas cooler where an absolute humidity is lower than the upstream side. Accordingly, the vapor would not be condensed. For the sake of simple structure, the exemplary embodiment is not specifically provided with any equipment for separating the drainage from the gas. However, an eliminator and a demister may be provided on the downstream of the gas cooler. In this case, water can be surely separated.

A gas cooler 6b, check valve 10 and a receiver tank 12 are provided on the downstream of the second-stage compressor 1b. A discharged gas 5b from the second-stage compressor 1b is cooled in the gas cooler 6b, and then is partially stored in the receiver tank 12. The remaining gas is fed to each gas consumption destination on the downstream. An air-discharge passage 18 branches from between the gas cooler 6b and the check valve 10, and a bleed valve 9 is installed on the way to the air-discharge passage 18. When the bleed valve 9 is opened, the discharged gas from the second-stage compressor 1b can be introduced into the suction filter 13. According to the exemplary embodiment, the air-discharge passage 18 leads to the suction filter 13, and the filter also functions as a silencer, so that the structure is simplified. It goes without saying that a silencer may be separately provided so as to open to the atmosphere.

The pressure on the downstream of the check valve 10 is a supply pressure applied to a process, and so the multi-stage compressor 1 is controlled so as to keep the pressure substantially constant. Thus, a pressure measuring apparatus 11a for measuring a supply gas pressure is installed on the downstream of the check valve. A control device 11 is provided for controlling a constant gas pressure based upon a gas pressure which is measured by the pressure measuring apparatus 11a. Furthermore, control signals 19a, 19b are transmitted from the control device 11 to the bleed valve 9 and the suction throttle valve 7, respectively, to control an operating condition of the compressor 1 in accordance with the supply gas pressure.

The operating condition of the compressor 1 is controlled in accordance with the supply gas pressure, which is applied to the process, such that when the supply gas pressure is lower than a predetermined pressure which is preset in the control device 11, the suction throttle valve 7 is opened and the bleed valve 9 is closed for a usual load operation. On the other hand, when the supply gas pressure exceeds the preset pressure due to less gas consumption in the process, the bleed valve 9 is opened so as to prevent the compressor 1 from surging and to save power consumption. At the same time, the suction throttle valve 7 is throttled for controlling in a non-load operation (in fact, load is reduced but does not become zero).

Since the suction throttle valve 7 is opened at the time of load operation, the pressure of the sucked gas 4a in the first-stage compressor 1a is substantially equal to an atmospheric pressure to be approximately one atm. Both of the first-stage and the second-stage compressors 1a, 1b are designed to have each compression ratio of about three in a specific point. A discharged gas 5a from the first-stage compressor 1a and the sucked gas 4b in the second-stage compressor 1b are of about 3 atm, and a discharged gas 5b from the second-stage compressor 1b is of about 9 atm.

At the time of non-load operation, the bleed valve 9 is opened and the suction throttle valve 7 is throttled so that the compression ratio is maintained at approximate 3 atm. Accordingly, the pressure on the upstream of the bleed valve 9 (which is substantially equal to a discharge pressure of the second-stage compressor 1b) becomes about 1.5 atm. due to pressure loss in the valve and a pipe line, and the sucked gas pressure of the second-stage compressor 1b and the discharged gas pressure of the first-stage compressor 1a become about 0.5 atm. The sucked gas pressure of the first-stage compressor 1a becomes about 0.2 atm.

An extracting section 14a is provided between the intercooler 6a and the second-stage compressor 1b, and an extracting section 14b is provided midway in the air-discharge passage 18 on the downstream of the bleed valve 9. A work gas for the compressor 1 is extracted from the extracting sections to cool the motor 2. The extracting sections 14a, 14b are located downstream of the gas coolers 6a, 6b, respectively. The gas fed from the extracting sections is cooled down to about an ordinary temperature, so that it can cool the motor 2 only by passing therethrough. A pressure regulating valve 8 and a check valve 20a are provided on an extracting flow passage 22a branched from the extracting section 14a, and a check valve 20b is provided on an extracting flow passage 22b branched from the extracting section 14b. The extracting flow passages 22a and 22b merge into one passage at the downstream of the check valves 20a and 20b to lead to the motor 2. The gas conducted into the motor 2 cools the motor 2 and then is discharged from the motor 2. The gas is conducted to a re-confluence portion 15 disposed between the suction throttle valve 7 and the first-stage compressor 1a. Although the extracting flow passages 22a and 22b merge into one passage on the downstream of the check valves 20a and 20b, they may lead directly to the motor 2 as they are.

At the time of load operation, the gas pressures of the extracting section 14a and the re-confluence portion 15 are about 3 atm. and 1 atm., respectively, as described above. Since the bleed valve 9 is closed, the gas does not flow in the air-discharge passage 18, and the gas pressure at the extracting section 14b is equal to the pressure at the suction filter 13 to be about 1 atm. Accordingly, there is a pressure difference of about 2 atm. between the extracting section 14a and the re-confluence portion 15 while a differential pressure between the extracting section 14b and the re-confluence portion 15 is approximately zero. Accordingly, a cooling gas 16 is exclusively fed from the extracting section 14a. A differential pressure, which can ensure a flow rate of gas required for cooling the motor 2, generally ranges from 0.5 to 1 atm. so that a sufficient amount of cooling gas can be supplied to the motor 2 from the extracting section 14a disposed between the stages.

The reason why the cooling gas is extracted not from downstream of the final-stage but from the intermediate stage is that a minimum required flow rate of cooling gas suffices to be ensured and flowing of cooling gas at a higher flow rate than the minimum required flow rate would lead to waste of a high-energy gas which is obtained by running the compressor. Further, in terms of economy, a differential pressure of about 2-atm is too high for cooling the motor, so that it is preferable to throttle the pressure regulating valve 8 to reduce the cooling gas to a minimum required pressure to conduct the same to the motor 2.

Since the suction throttle valve 7 is throttled at the time of non-load operation, gas pressures at the extracting section 14a and the re-confluence portion 15, are about 0.5 atm. and 0.2 atm., respectively, as described above. The bleed valve 9 is opened to permit the gas to flow into the air-discharge passage 18, and the flow passage is throttled by a throttle 21 such as an orifice, the throttle valve or the like provided between the suction filter 13 and the extracting section 14b midway the air-discharge passage, whereby a gas pressure a little over 1-atm is obtained at the extracting section 14b. Without the throttle 21, the pressure at the extracting section 14b would be substantially equal to the pressure at the suction filter to be about 1 atm., so that a pressure difference between the re-confluence portion 15 and the extracting section 14a is about 0.3 atm. and a pressure difference between the re-confluence portion 15 and the extracting section 14b is a little over 0.8 atm. Therefore, the cooling gas 16 is fed exclusively from the extracting section 14b. Thus, it is possible to ensure a flow rate of cooling gas flow required for cooling the motor at the time of non-load operation.

At the time of non-load operation, a velocity is constant to cause no change in windage loss and iron loss of the magnetic bearings but to cause reduction in iron loss of the motor driving section, so that a required flow rate of cooling air is less than that of load operation. A throttle such as an orifice, throttle valve and the like may be provided midway an extracting flow passage 22b branched from the extracting section 14b to further reduce a flow rate of cooling gas flowing to the motor. However, with such arrangement, an economic merit is small at the time of non-load operation aside from at the time of load operation. Furthermore, the cooling gas may be introduced directly from the atmosphere, not from midway the air-discharge passage 18. In this case, that vapor in the atmosphere may condense in the motor, so that a dust-removing filter is necessary at a suction port.

Figure 3:
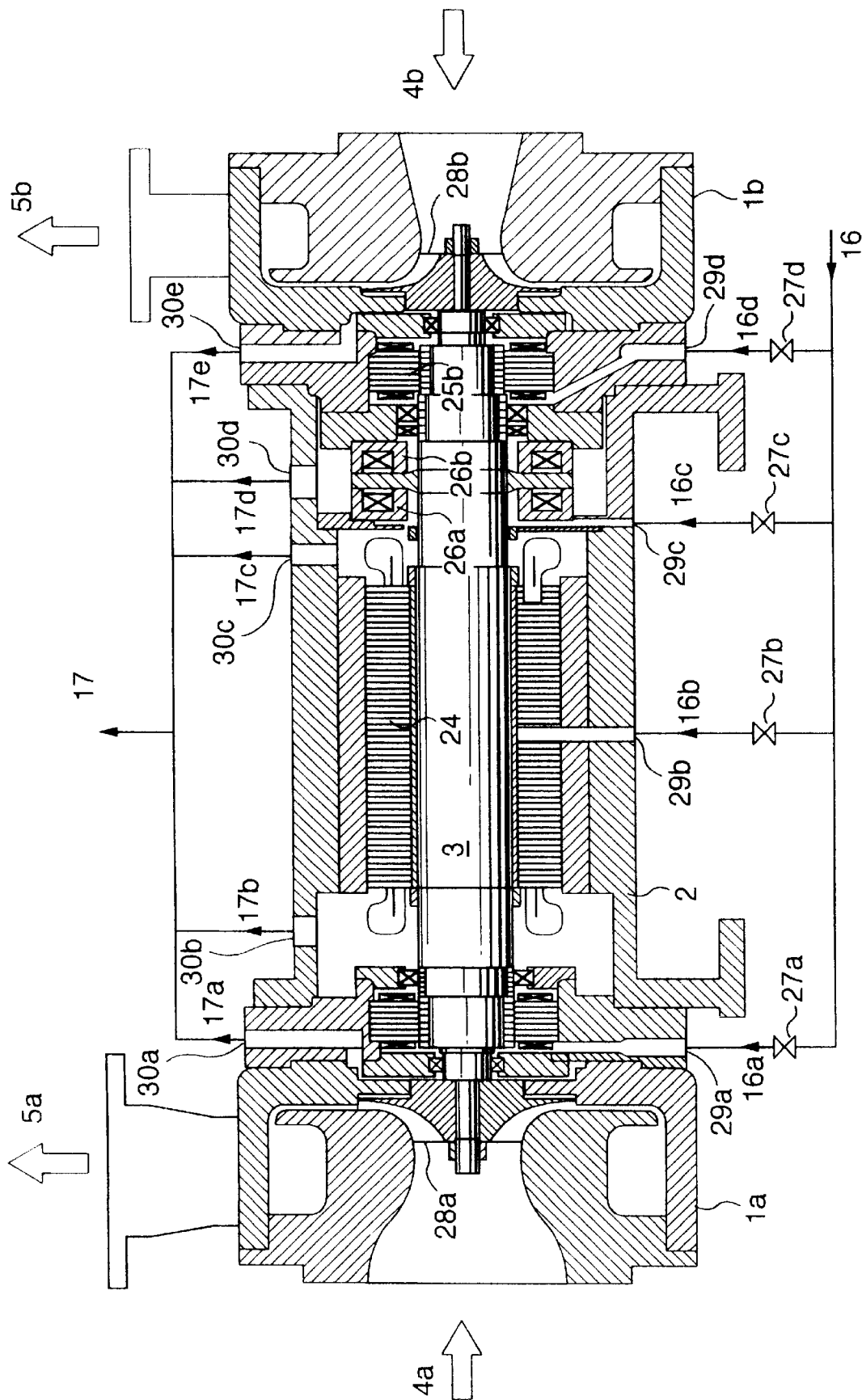
FIG. 3 is a longitudinal sectional view showing in detail an inside of the compressor according to the embodiment.

FIG. 3 schematically shows an internal structure of the motor 2 and the compressors 1a, 1b and a supply path of the motor cooling gas.

Referring now to FIG. 3, the first-stage and second-stage compressors 1a and 1b have impellers 28a and 28b, respectively, which are mounted directly to both ends of a rotating shaft 3 extending from a body of a motor 2. The motor 2 is an inverter-controlled high-speed motor, and is provided at its center with a drive section 24. The rotating shaft is supported by two sets of radial magnetic bearings 25a, 25b arranged between the drive section 24 and two impellers 28a, 28b. In addition, provided on a side of the radial magnetic bearing 25b on the second-stage compressor 1b toward the drive section 24 are axial magnetic bearings 26a, 26b which bear an axial thrust generated by the compressor 1.

In the motor 2 of the embodiment, heat generation is attributed to iron loss, which is an electrical loss in a coil and the like, and windage loss caused by a high-speed rotation of a rotor. A main heat source is the drive section 24, the radial magnetic bearings 25a, 25b and the axial magnetic bearings 26a, 26b of the motor and clearances between these and the rotor. At the time of load operation of the compressor, the motor drive section 24 greatly generates heat while the magnetic bearings generate less heat as compared therewith. At the time of non-load operation of the compressor, a velocity of the compressor is constant and so an amount of heat generated by windage loss is not varied. However, a driving power of the motor 2 becomes smaller, so that heat generated by iron loss of the motor drive section 24 is made less than at the time of load operation.

In order to dissipate heat generated from the heat sources, a part of the gas pressurized by the compressor and cooled by the gas cooler is extracted to be fed to the motor 2 as the cooling gas 16. The motor has cooling gas feeding sections 29a, 29b, 29c, 29d at four locations in total near the respective heat sources. The respective feed sections have feed ports at a plurality of locations in a circumferential direction. After the motor 2 is cooled, the motor cooled gas is also discharged through a plurality of discharge ports provided in the discharge sections 30a, 30b, 30c, 30d, 30e at five locations in total.

A cooling gas 16a cools mainly the radial magnetic bearings 25a on the side of the first-stage compressor 1a, and is introduced from the cooling gas feeding section 29a to a clearance formed between the radial magnetic bearings 25a and the impeller 28a. A part of the cooling gas is discharged from the discharging section 30a together with a flow which leaks from the first-stage compressor 1a, and the remainder of the cooling gas passes through the clearance between the magnetic bearings 25a and the rotating shaft 3 to cool the magnetic bearings 25a and is then discharged from the discharging section 30b. Similarly, a cooling gas 16b cools the motor drive section 24 and then discharged from the discharging sections 30b, 30c. After cooling the axial magnetic bearings 26a, a cooling gas 16c is discharged from the discharging section 30d. After cooling the axial magnetic bearings 26b and the radial magnetic bearings 25b, a cooling gas 16d is discharged from the discharging sections 30d, 30e.

The passage of the cooling gas 16 in the motor 2 is complicated and diversified, and pressure loss between the feeding section and the discharging section is different every position of the respective feeding sections. Accordingly, air-flow adjusting throttles 27a, 27b, 17c, 17d such as orifices, valves and the like are provided upstream of the respective feeding section 29a, 29b, 29c, 29d in order to ensure flow rates of air flow required for cooling the respective heat generating sections.

In the exemplary embodiment, impellers of the compressors are mounted directly to the rotating shaft of the motor but they may be connected to the rotating shaft by couplings or the like. The number and arrangement of the impellers are not limited to the embodiment. That is, the present invention is commonly applicable to a multi-stage compressor which can switch between load operation and non-load operation. As described above, the arrangement shown in FIGS. 1 to 3 can realize a multi-stage compressor which ensures a flow rate of cooling gas required for the cooling of the motor or the magnetic bearings during non-load operation without increasing the cost during load operation.

Figure 4:
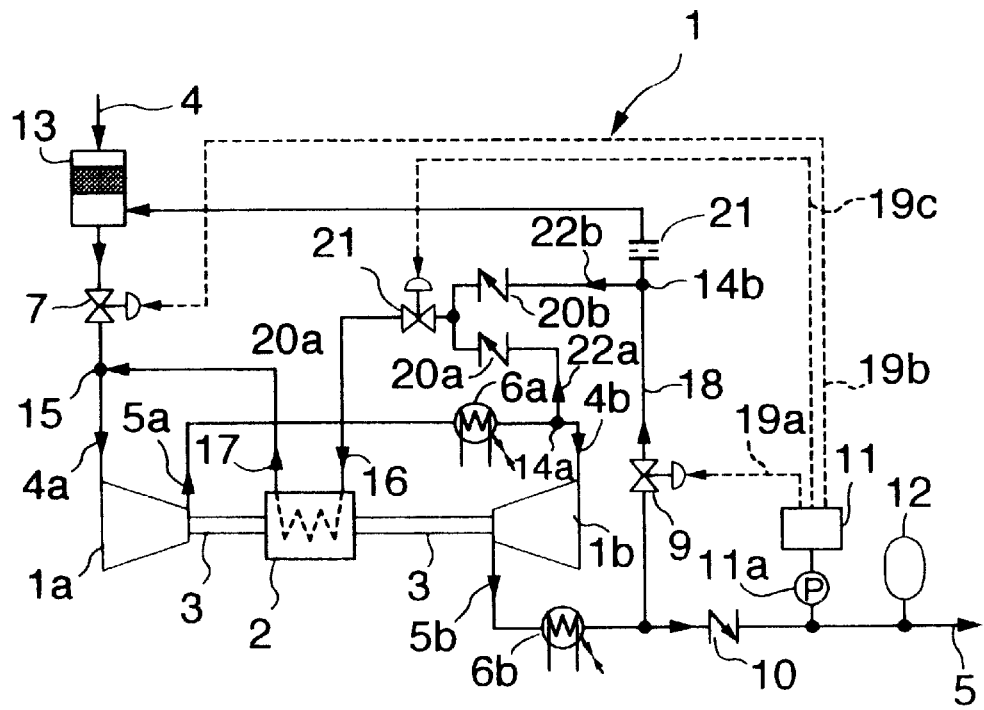
FIGS. 4 and 5 are block diagrams showing a modification of the embodiment.
Figure 5:
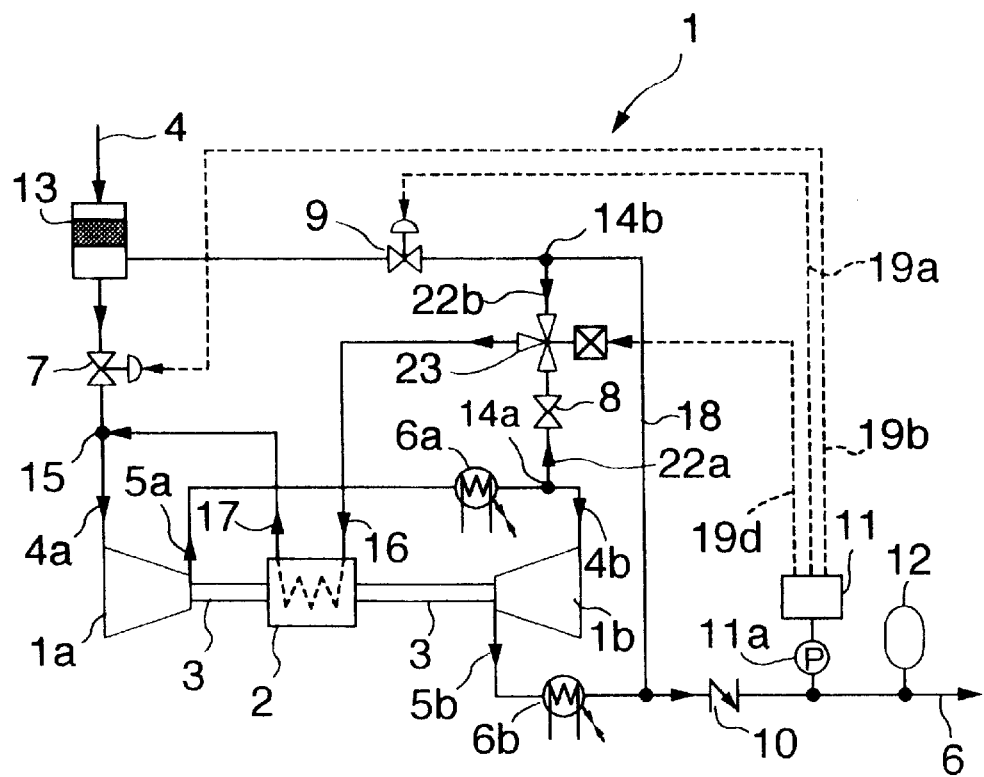

FIGS. 4 and 5 show a block diagram showing modifications of the embodiment. The modification shown in FIG. 4 is different from the embodiment shown in FIG. 1 in the flow passages of cooling gas from the extracting sections 14a, 14b to the motor 2. Otherwise, the same reference numerals denote the same elements.

Referring to FIG. 4, the extracting sections 14a, 14b for cooling the motor 2 are provided between the intermediate gas cooler 6a and the second-stage compressor 1b and in the air-discharge passage 18 located downstream of the bleed valve 9. The check valves 20a, 20b are provided in the extracting flow passages 22a, 22b which lead from the extracting sections 14a, 14b. The extracting flow passages 22a, 22b merge into one passage downstream of the check valves 20a, 20b to lead to the motor 2 through the pressure regulating valve 8. An opening ratio of the pressure regulating valve 8 is adjustable depending upon whether the compressor is in load operation or non-load operation. A control signal 19c for such opening ratio is provided by the control device 11.

In the modification, pressures at the extracting sections 14a, 14b and the re-confluence portion 15 are the same as those in the embodiment shown in FIG. 1. During load operation, they are about 3 atm., about 1 atm. and about 1 atm., respectively. During non-load operation, they are about 0.5 atm., around 1 atm. and about 0.2 atm., respectively. Accordingly, the cooling gas is provided from the extracting section 14a during load operation and is provided from the extracting section 14b during non-load operation like in the first embodiment.

In the modification, the cooling gas provided from the extracting sections 14a, 14b passes through the pressure regulating valve 8. During load operation, pressure at the extracting section 14a is about 2-atm higher than that at the re-confluence portion 15, so that when the pressure regulating valve is throttled, a minimum flow rate of gas required for cooling the motor 2 is passed. During non-load operation, the pressure regulating valve 8 is opened to ensure a flow rate of air flow required for cooling the motor 2. In such a manner, an opening degree of the pressure regulating valve 8 is controlled in accordance with a operating state of load operating or non-load operating on the basis of a control signal 19c from the control device 11. In this case, the control device 11 transmits a control signal for the pressure regulating valve 8 together with a constant gas pressure control signal.

Owing to such arrangement described above, the second embodiment can provide the same effect as that in the first embodiment shown in FIG. 1. That is, it is possible in the second embodiment to ensure a flow rate of cooling gas required for cooling the motor or the magnetic bearings during non-load operation without getting expensive during load operation.

FIG. 5 shows another modification of the embodiment shown in FIG. 1. The modification shown in FIG. 5 is different from the embodiment shown in FIG. 1 in flow passages of cooling gas leading from the extracting sections 14a, 14b to the motor 2. The same reference numerals in the drawing denote the same elements.

Referring to FIG. 5, the extracting section 14a for cooling the motor 2 is provided between the intermediate gas cooler 6a and the second-stage compressor 1b like in the embodiment shown in FIG. 1. On the other hand, the extracting section 14b is provided in the air-discharge passage 18 upstream of the bleed valve 9 unlike in the embodiment shown in FIG. 1. The extracting section 14b must not necessarily be provided in the air-discharge passage 18 but may be located downstream of the gas cooler 6b which is substantially equal in pressure to the air-discharge passage 18 and is provided downstream of the second-stage compressor 1b. Since the extracting section 14b is located upstream of the bleed valve 9, any device is not necessary which corresponding to the throttle 21 in the embodiment in FIG. 1.

Supply passages branched from the extracting sections 14a, 14b are connected to a three-way valve 23, and the cooling gas is supplied only from either one of the supply passage to the motor 2. The three-way valve is switched in route depending upon whether the compressor is in load operation or in non-load operation. A switching control signal 19d is output from the control device 11. The pressure regulating valve 8 is installed between the extracting section 14a and the three-way valve.

In the modification, pressures at the extracting section 14a and the re-confluence portion 15 are the same as in the embodiment shown in FIG. 1. During load operation, they are about 3 atm. and about 1 atm., respectively, and are about 0.5 atm. and 0.2 atm., respectively, during non-load operation. Pressure at the extracting section 14b is substantially the same as the discharge pressure from the second-stage compressor 1b, such that it is about 9 atm during load operation and about 1.5 atm during non-load operation.

In the multi-stage compressor shown in FIGS. 1 and 4, a path of the cooling gas for the motor 2 is definitely determined by pressures at the extracting sections 14a, 14b. In contrast, in the modification shown in FIG. 5, a path of the cooling gas for the motor 2 is selectively determined by switching of the three-way valve. On the basis of the control signal 19d from the control device 11, switching of the three-way valve is controlled depending upon load operation and non-load operation. At this time, a control signal for the pressure regulating valve 8 is also output from the control device 11 together with the constant gas pressure control signal.

During load operation, the three-way valve 23 is opened toward the flow passage branched from the extracting section 14a. The cooling gas is throttled to the irreducible minimum flow rate by the pressure regulating valve 8 to be conducted to the motor 2. The extracting section 14b is located upstream of the bleed valve 9 to have a pressure of about 9 atm. Since the three-way valve 23 is closed toward the flow passage branched from the extracting section 14b, a large amount of gas may not be uneconomically passed to the motor 2.

During non-load operation, the three-way valve 23 is opened to the flow passage branched from the extracting section 14b. In this case, a pressure difference between the re-confluence portion 15 and the extracting section 14b is about 1.3 atm. and it is enabled to ensure a flow rate of the cooling gas flow required for cooling the motor.

Similarly to the embodiment shown in FIG. 1, the above-described construction can ensure an adequate flow rate of the cooling gas required for cooling the motor or the magnetic bearings during non-load operation with economy during load operation.

Although a two-stage centrifugal compressor is exemplified and described above, it is to be understood that the above can be applied to a three-stage or more centrifugal compressor. Furthermore, the compressor is not limited to a centrifugal type compressor but may be an axial flow type compressor or a displacement type compressor.

As clearly described in the above detailed description, the multi-stage compressor according to the invention is constructed such that the cooling gas for the motor is extracted from a plurality of extracting sections, and so the cooling gas can be extracted from the intermediate stage of the compressor during load operation and from the air-flow passage during non-load operation. Accordingly, it is possible to ensure a flow rate of the cooling gas flow required for cooling the magnetic bearings during non-load operation with economy during load operation.

The multi-stage compressor supported by the magnetic bearings, according to the present invention, is constructed such that the cooling gas for the magnetic bearings is extracted from a plurality of extracting sections, and thus can be extracted from the intermediate stage of the compressor during load operation and from the air-flow passage during non-load operation. It is possible to ensure a flow rate of the cooling gas required for cooling the magnetic bearings during non-load operation with economy during load operation.

It goes without saying that the present invention can be otherwise embodied without departing from the sprit and essential features thereof. Accordingly, the embodiment and modifications described and shown herein are exemplary and not restrictive. The scope of the present invention is set forth in the appended claims, and all modifications within the claims are included in the present invention.

What is claimed is:

1. A multi-stage compressor adapted to be switched between load operation and non-load operation, comprising: a high-speed electric motor having a rotating shaft; a first and a second compressor stage including impellers mounted on both ends of said rotating shalt; and inter-cooler mounted between said first and second compression stages; a suction throttle valve provided on a suction side of the compressor; a bleed valve provided on a discharge side of the compressor; and a first and a second branch passage wherein said first branch passage branches from a downstream side of said impeller disposed at said second stage and wherein said second branch passage is branched from a downstream side of said inter-cooler; said first and second branch passages connect with each other to form a confluent passage, and said confluent passage connects to form a cooling flow passage for permitting a cooling gas to pass through said high-speed electric motor.

2. The multi-stage compressor according to claim 1, further comprising magnetic bearings provided on said high-speed electric motor to support said rotating shaft; and wherein said flow passage for permitting a cooling gas to pass through said high-speed electric motor extends to said magnetic bearings.

3. The multi-stage compressor according to claim 2, further comprising a pressure detection means for detecting a discharge pressure of said compressor; and an operation control means for switching between load operation and non-load operation based on an output from said pressure detection means.

4. The multi-stage compressor according to claim 2, further comprising a return flow passage for returning the cooling gas having cooled said magnetic bearings to downstream of said suction throttle valve.

5. The multi-stage compressor according to claim 1, wherein said inter-cooler is provided with a drain recovering section.

6. The multi-stage compressor according to claim 1, further comprising a check valve provided between at least one of said first or second branch passages and said confluent passage.

7. The multi-stage compressor according to claim 1, further comprising said first branch passages downstream of said bleed valve.

8. The multi-stage compressor according to claim 1, further comprising a pressure regulating valve provided in said second branch passages branched from downstream of said inter-cooler.

9. The multi-stage compressor according to claim 8, further comprising a control means for changing an opening degree of said pressure regulating valve depending upon load operation and non-load operation.

10. The multi-stage compressor according to claim 1, further comprising a flow control means for controlling on/off of flow in said first and second branch passages.

11. The multi-stage compressor according to claim 10, wherein said flow control means allows flow in said second branch passage branched from downstream of said inter-cooler during load operation and stops flow in said first branch passage during load operation.

12. The multi-stage compressor according to claim 11, wherein said flow control means allows flow in said first branch passage branched from downstream of the second-stage impeller and stops flow in said second branch passage during non-load operation.

13. The multi-stage compressor according to claim 1, further comprising a return flow passage for returning the cooling gas having cooled said high-speed electric motor to downstream of said suction throttle valve.

14. The multi-stage compressor according to claim 1, wherein said impellers are centrifugal.

15. The multi-stage compressor according to claim 1, further comprising a pressure detection means for detecting a discharge pressure of said compressor; and an operation control means for switching between load operation and non-load operation based on an output from said pressure detection means.

16. A multi-stage compressor adapted to be switched between load operation and non-load operation, comprising: a high-speed electric motor having a rotating shaft; a first and a second compressor stage including impellers mounted on both ends of said rotating shaft; an inter-cooler mounted between said first and second compression stages; cooling flow passages for cooling of said high-speed electric motor during load operation of said compressor and during non-load operation of said compressor; and wherein said cooling flow passages for load operation and for non-load operation are branched at different positions between said inter-cooler and the impeller on said second stage and between the impeller on said second stage and said bleed valve.

17. A multi-stage compressor adapted to be switched between load operation and non-load operation, comprising: a high-speed electric motor having a rotating shaft; a first and a second compression stage including impellers mounted on both ends of said rotating shaft; an inter-cooler mounted between said first and second compression stage; cooling flow passages for cooling of said high-speed electric motor during load operation of said multi-stage compressor and during non-load operation of said multi-stage compressor; and wherein at least one of said cooling passages is branched from atmospheric pressure.

* * * * *